(12) United States Patent
Bloemsma et al.

(10) Patent No.: US 10,357,721 B2
(45) Date of Patent: Jul. 23, 2019

(54) DISTRIBUTED AND AUTONOMOUS CONTROL SYSTEM FOR GUIDED-PATH VEHICLES

(71) Applicant: DISNEY ENTERPRISES, INC., Burbank, CA (US)

(72) Inventors: Allan Bloemsma, Glendale, CA (US); William Willcox, Simi Valley, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 234 days.

(21) Appl. No.: 15/635,277

(22) Filed: Jun. 28, 2017

(65) Prior Publication Data

US 2019/0001227 A1    Jan. 3, 2019

(51) Int. Cl.
| | |
|---|---|
| A63G 21/04 | (2006.01) |
| A63G 21/06 | (2006.01) |
| A63G 7/00  | (2006.01) |
| G05D 1/00  | (2006.01) |

(52) U.S. Cl.
CPC ............... *A63G 21/04* (2013.01); *A63G 7/00* (2013.01); *A63G 21/06* (2013.01); *G05D 1/0088* (2013.01)

(58) Field of Classification Search
CPC .......... A63G 21/04; A63G 7/00; A63G 21/06; G05D 1/0088
See application file for complete search history.

(56) References Cited

U.S. PATENT DOCUMENTS

| | | | |
|---|---|---|---|
| 2010/0168940 A1* | 7/2010 | King | A63G 7/00 701/20 |
| 2014/0277691 A1* | 9/2014 | Jacobus | G06Q 10/087 700/216 |
| 2014/0277849 A1* | 9/2014 | Grant | G05D 1/0027 701/2 |
| 2015/0336012 A1* | 11/2015 | Maycock | G05D 1/0022 701/2 |
| 2016/0259332 A1* | 9/2016 | Boshears | A63G 7/00 |
| 2018/0120862 A1* | 5/2018 | Dembinski | B61L 27/0022 |
| 2018/0140957 A1* | 5/2018 | Woodcock | A63G 1/10 |

\* cited by examiner

*Primary Examiner* — Thomas Ingram
(74) *Attorney, Agent, or Firm* — Marsh Fischmann & Breyfogle LLP; Kent A. Lembke

(57) ABSTRACT

A ride control system that uses a state determination assembly to determine vehicle position and speed of the vehicle. The control system automatically prevents collisions between the controlled vehicle and other vehicles and obstacles along the vehicle's path without human operator intervention based on its position and speed as well as that of the other vehicles and the position and current operating state of upcoming obstacles. The control system automatically maintains a predetermined clearance between the controlled vehicle and other vehicles and obstacles, such as on a ride path, without human operator intervention regardless of vehicle inertia. The control system may be configured to automatically position and/or park a vehicle anywhere along the ride path with a high degree of accuracy in a minimum amount of parking time, without human operator intervention, and regardless of vehicle inertia.

21 Claims, 6 Drawing Sheets

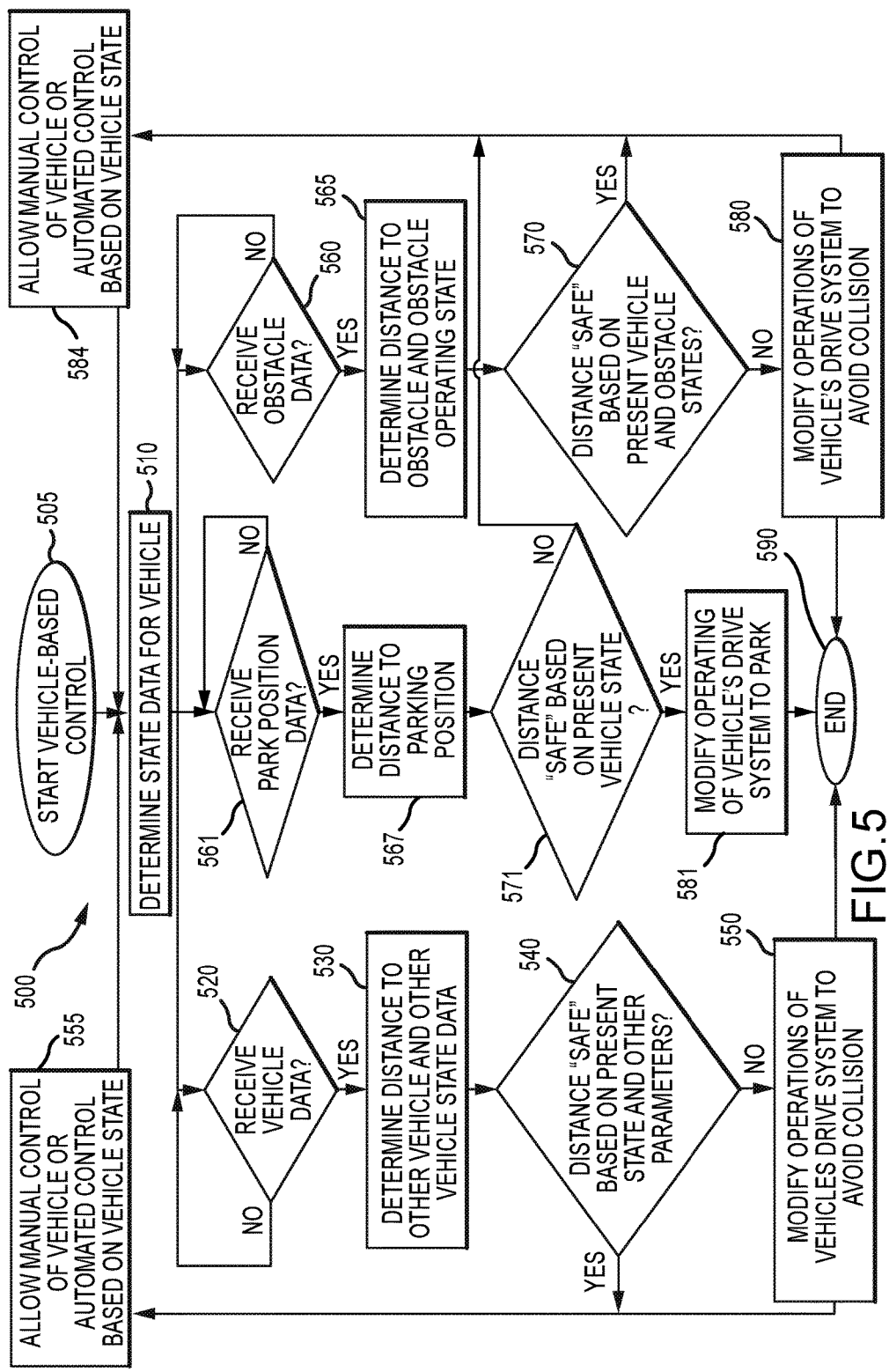

DISTRIBUTED AND AUTONOMOUS CONTROL SYSTEM FOR GUIDED-PATH VEHICLES

BACKGROUND

1. Field of the Description

The present description relates, in general, to controlling guided-path vehicles or vessels such as those that travel upon or are coupled to a track. More particularly, the present description relates to a new control system and associated control method for use in effectively and safely controlling vehicles to avoid vehicle-to-vehicle and vehicle-to-obstacle collisions. The control system and method are particularly well-suited for use in amusement and theme parks to control speed and position of vehicles such as those taking the form of water craft or vessels guided through a body of water via coupling to a guide track. The vehicles (which include water vessels such as semi-submersibles and surface craft) are all considered "guided-path vehicles," whether they ride directly on a track or are guided to follow a path defined by a track or the like.

2. Relevant Background

There are numerous applications where it is desirable to provide effective and accurate control over vehicles designed to travel on a path in a guided manner. For example, amusement and theme parks often include multiple rides that include passenger vehicles that travel upon tracks or that are guided using a track or similar guide path structure through a space. These ride vehicles often include onboard drive systems to move the vehicles along the track-based path with an onboard operator providing input to cause the vehicle to accelerate and brake along the path and, in some cases, to steer the vehicle (e.g., left and right while following a track via a tether, linkage, or the like). One specific ride example involves use of a number of semi-submersibles to carry passengers under the surface of a body of water along a predefined path, and each semi-submersible is operated by a "captain" who controls the vehicle's speed along a guided-path so as to avoid collisions with other vehicles (i.e., other semi-submersibles) and any obstacles in the body of water.

Amusement park operators and ride designers have long understood that operator-driven vehicles are subject to a number of potential operational problems. Typical rides involve a number of vehicles following sequentially along a guided-path, but there is often no mechanical structure preventing vehicle-to-vehicle collisions. For example, a leading vehicle may be traveling more slowly than a trailing vehicle (e.g., a second semi-submersible following a first semi-submersible under water in a water-based ride), and the leading vehicle may be around a blind corner such that the trailing vehicle's operator has difficulty braking or slowing the second vehicle once the first vehicle comes into view to avoid a collision. Operator-driven vehicles may also collide with obstacles in their path (e.g., the path defined by a track), and, in this regard, the obstacles may include track switches, ride action doors, and end-of-track stops. Another problem associated with operator-driven vehicles is to avoid loss of capacity (or ride throughput) due to the relatively large amount of time needed to manually park the vehicle in an accurate manner at load and unload positions of a ride station.

The larger and heavier the vehicle, the more likely the operator-driven vehicle will experience one or more of these problems. Further, many large and heavy vehicles, such as a semi-submersible, used in park rides have drive systems that only move the vehicles at relatively slow rates. As a result, many of these vehicles are more susceptible to collision and navigation issues because these vehicles respond sluggishly and/or slowly to operator propulsion commands (e.g., are slow to speed up, slow to stop or slow down, and slow and/or difficult to turn or maneuver). Operational problems are challenging to overcome with improved controls in part because it often is difficult to accurately determine vessel or vehicle position along its guided-path and also because vehicle-to-vehicle visibility can be limited or obstructed such as when the ride path includes bends.

Existing techniques for addressing collision and capacity problems with operator-driven vehicles have not been wholly successful such that new designs are still in demand by park operators and ride designers. The existing control approaches include use of block zone systems with go/no go logic or power switching to move or stop vehicles that use a centralized control system that detects the position of each vehicle or obstacle and acts to maintain a safe spacing between vehicles and obstacles. The existing control approaches also include simply relying upon the skill set of onboard human operators that manually control the speed and position of the vehicle to avoid collisions with other vehicles and obstacles. Other techniques for controlling vehicles involve hybrid control systems that utilize onboard position versus time databases in conjunction with local position sensors or encoders to playback motion commands, which attempt to avoid collisions through the use of block zone systems.

SUMMARY

Briefly, a control system is described that is useful in any park ride or other application that uses guided-path vehicles, including vessels or watercraft used in water-based rides such as semi-submersible rides, that are controlled in part by human operators. Typically, the vehicles ride on tracks or have a ride path defined by a track or similar structure such as through linkages to a bogie or the like riding on a track at the bottom of a body of water. The inventors recognized that the new control system (and rides that incorporate this system and associated control method) was needed or at least desirable because of concerns with prior or existing vehicle control systems. For example, prior control systems may rely exclusively or largely on the skill of each vehicle operator, and, in the same or other control systems, there was a heavy reliance on centralized computers. As a result, large numbers of operators are required for each ride, and these operators have to be well trained and have to maintain a high situational awareness at all times to limit the chance of collision. Additionally, many existing control systems do not work well or at all in water. Another concern is that large and heavy vehicles with low power propulsion systems are very difficult to manually park at load and unload positions or to maintain a desirable position versus a time profile as well as to navigate to avoid other vehicles and obstacles.

The control system addresses these and other issues with prior control techniques by providing an integrated and distributed control assembly or mechanism on each vehicle rather than relying upon centralized control. The new control system differs from prior techniques in a number of ways. First, the control system is configured with the assumption that each vehicle in a ride (or other vehicle system) is restricted to travel on a known, predetermined path, which may be closed and curvilinear, and this restriction or guidance is provided by a track guide or other equipment that generally constrains the possible positions of each vehicle. Second, the control system uses a location mechanism and/or state-determination assembly (e.g., a GPS (global positioning system) device, a differential GPS device, an inertial navigation device, an absolute position calibration mechanism, or the like) to determine vehicle position data regardless of whether the vehicle is indoors or outdoors, and, in some cases, the "state" will also include present speed as well as location. Third, the control system may be configured to automatically prevent collisions between the controlled vehicle and other vehicles and obstacles along the vehicle's path without human operator intervention regardless of vehicle inertia (such as for a water vessel). Fourth, the control system automatically maintains a predetermined clearance between the controlled vehicle and other vehicles and obstacles, such as on a ride path, without human operator intervention regardless of vehicle inertia. Fifth, the control system is also, in some embodiments, configured to automatically park a vehicle anywhere along the ride path with a high degree of accuracy in a minimum amount of parking time and without human operator intervention, again regardless of vehicle inertia. Sixth, in some embodiments, the control system is also configured to include devices to allow the vehicle position along the ride path to be programmed (and controlled) as a function of time or other useful criteria.

More particularly, a park ride is provided that has distributed and autonomous control of vehicles. The park ride includes a ride path (such as may be defined by a track). The park ride also includes a plurality of vehicles each constrained to move along the ride path and each including a drive system for moving the vehicle at a speed within a range of speeds. The park ride further includes a control assembly provided on each of the vehicles. Each of the control assemblies includes: (1) a transceiver transmitting and receiving messages with state data between vehicles; (2) a distance determination module processing the state data for the sending vehicle and the state data from another vehicle to determine a distance between the sending vehicle and the other vehicle; and (3) a control module generating a drive control signal for the drive system, based on the distance, the velocity difference, and/or acceleration rates, that modifies the speed of the sending vehicle.

In some implementations, the state data includes a position of the sending vehicle, and the control assembly further includes a state determination mechanism determining the position. The state determination mechanism then may further operate to determine a speed and an acceleration of the sending vehicle, and the state data may include the speed and the acceleration of the sending vehicle. Then, the control module may generate the drive control signal based on the speed and the acceleration of the sending vehicle. The state determination mechanism may be adapted to determine the position when the sending vehicle is outdoors or indoors.

In some cases, the drive control signal causes the drive system to reduce the speed and override any manual operator inputs to the drive system. In these or other embodiments, the drive control signal is generated based on a time table with waypoints on the ride path for the sending vehicle, and the drive control signal causes the drive system to accelerate or decelerate to arrive at one of the waypoints within an arrival time defined by the time table. In some preferred implementations, the drive control signal is further generated by the control module based on parameters of the vehicle or parameters of the drive system.

The park ride may further include an obstacle with a state change mechanism and an obstacle control assembly. The obstacle control assembly operates: (1) to communicate obstacle state data to the vehicles that includes a position of the obstacle and an operating state of the obstacle; (2) to determine a distance between the obstacle and at least one of the vehicles; and (3) to operate the state change mechanism based on the determined distance so as to modify the operating state of the obstacle. In some cases, the modifying of the operating state of the obstacle includes changing the obstacle from a first operating state in which the obstacle at least partially blocks the ride path to a second operating state in which the obstacle allows passage of the vehicles on the ride path nearby the position of the obstacle. In these or other cases, at least one of the vehicles receives the obstacle state data from the obstacle with the transceiver and, in response, uses the distance determination module to determine a distance between the at least one of the vehicles and the obstacle and uses the control module to generate the drive control signal to decrease the speed of the vehicle when the obstacle state data indicates the obstacle is in an operating state that blocks the ride path.

BRIEF DESCRIPTION OF THE DRAWINGS

FIG. 5 is a flow diagram of a distributed ride control method showing steps or functions carried out on each vehicle by an onboard control assembly.

DETAILED DESCRIPTION OF THE PREFERRED EMBODIMENTS

Figure 1:
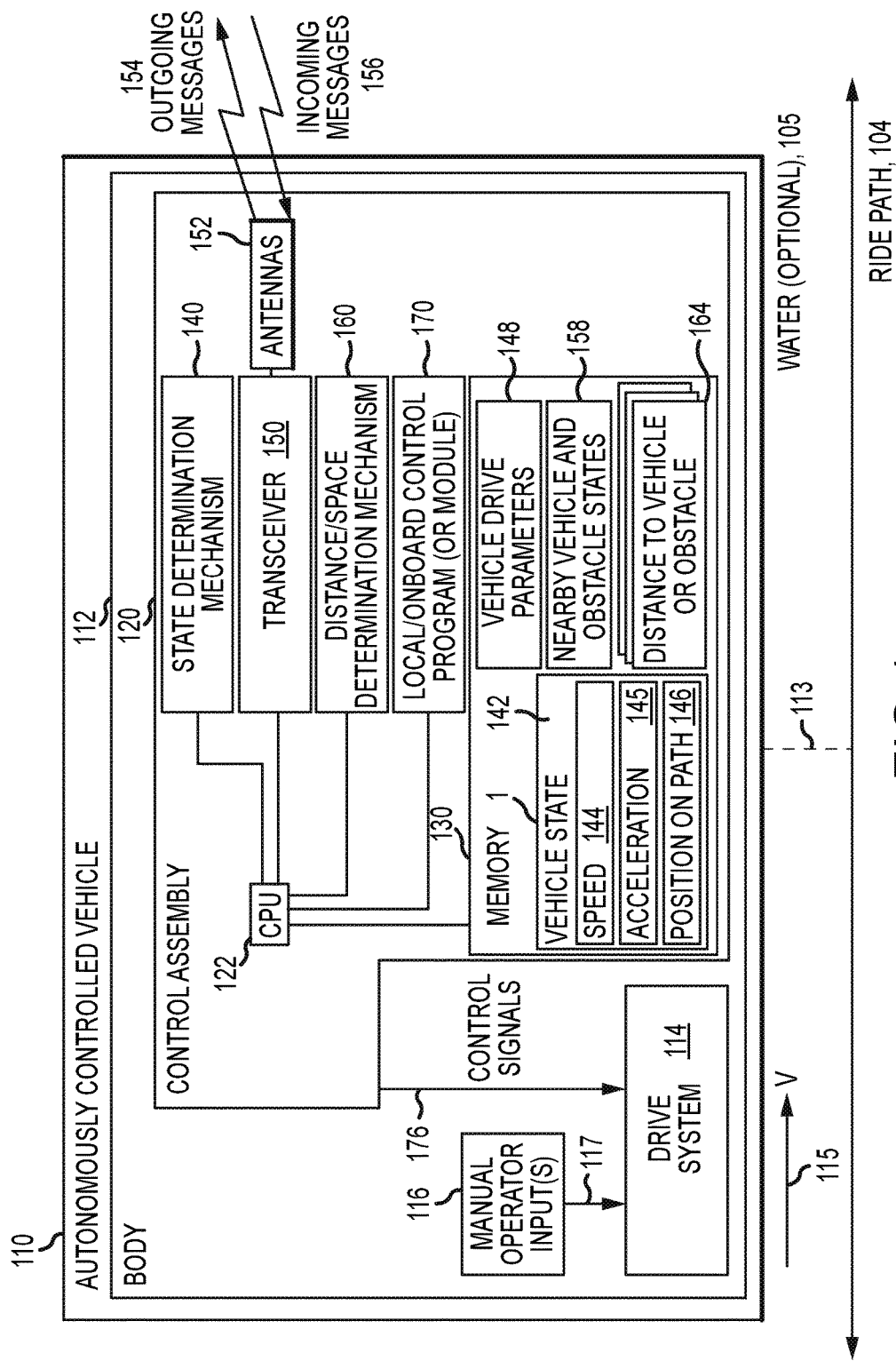
FIG. 1 is a functional block diagram of an exemplary vehicle (land or water passenger vehicle or the like) for use in a park ride incorporating the distributed control system of the present description.

Briefly, a control system is provided that is useful in park rides and other settings where vehicles are guided along predefined paths and in which the vehicles include drive or propulsion systems operable by onboard human operators. For example, but not as a limitation, the control system is well suited for use in water-based rides with relatively large watercraft or vessels that are large and heavy and often have slow and/or low power propulsion systems. The control systems are useful indoors as well as outdoors and are useful even when visibility from a controlled vehicle to other vehicles and obstacles may be limited such as a ride with curved paths that may lead to blind corners.

The control system may be thought of as a distributed ride control system as an integrated control assembly may be provided on each vehicle (or vessel) of the ride, and each vehicle-based control assembly has the following components and/or functionality: (1) a state determination mechanism for measuring the position, speed, and acceleration (i.e., the "state") of the vehicle (and this mechanism may include GPS sensors, differential GPS devices, inertial navigation components, and/or fixed location position sensors); (2) a distance (or envelope) determination mechanism (which may include a transponder) that processes vehicle state information (including current position on the ride path) into packets, receives and processes similar data packets from other vehicles and obstacles on the ride path, and calculates the distance to the vehicles and obstacles (which transmitted the communication/message with the data packets) ahead or behind the vehicle on the ride path; (3) a transceiver, such as a wireless packet data transceiver, that continuously monitors other vehicles and obstacle communications (data packets and the like) and transmits the state information collected by the state determination mechanism to all other vehicles on the ride (or on the particular ride path); (4) an antenna on each vehicle and obstacle that receives and transmits messages/data packets from the packet data transceiver; (5) a control program/module (or command processor) that integrates the current state of the vehicle (e.g., its position, speed, and acceleration) and the vehicle propulsion performance with similar data from adjacent or nearby vehicles and/or obstacles and that, in response, acts to keep a safe distance between the controlled vehicle and other vehicles and obstacles blocking its path as well as, in some cases, optimizing the timing along the vehicle path. and minimizing the time needed to accurately park the vehicle; (6) a command generator for inserting propulsion commands into the propulsion system's command processor; (7) a module/mechanism for translating the output of the propulsion command processor into either electric power to a propulsion motor or throttle settings on a propulsion engine; and (8) a propulsion motor or engine connected to the wheels or propeller of the vehicle operating in response to the output from the propulsion command processor. Note, in some cases, the control system would be thought of as including the first five (or potentially six) of these components/functions with the others being a part of the onboard drive or propulsion system of the vehicle.

A ride with tracked or guided-path vehicles may further include a set of obstacles such as track switches, ride-path doors, and the like that are selectively moved into and out of the path defined for one or more of the controlled vehicles. In some cases, the ride control system may further be distributed by providing a subset of the components and/or functionalities provided on vehicles upon one or more obstacles of the ride. These obstacles are generally "fixed" in their location and alter their state such as a switch moving between two or more track positions or a door opening and closing on a ride path. These obstacles need to be in the proper position (or state) to allow a vehicle to pass, and each of these obstacles may be configured in a ride with a subset of the control assembly functions/components described for vehicles. Further, the obstacle control assembly would be configured to, instead of commanding propulsion functions, command obstacle states such as track switch position, door open or closed, or other obstacle operating states that allow a vehicle to pass nearby the obstacle on the ride path free of a collision with the obstacle.

With this in mind, the distributed ride control system may include an integrated control assembly on one or more obstacles on along a ride path, and each obstacle-based control assembly has the following components and/or functionality: (1) a state determination mechanism for measuring or determining a current operating state of the obstacle (e.g., door closed or open (or moving to one of these states)); (2) a distance determination mechanism that processes obstacle state information into packets, receives and processes similar data packets from vehicles on the ride path, and calculates the distance to the vehicles (which transmitted the communication/message with the data packets) on the ride path approaching or nearby the obstacle; (3) a transceiver, such as a wireless packet data transceiver, that continuously monitors vehicle communications (data packets and the like) and transmits the state information collected by the state determination mechanism to all the vehicles on the ride (or on the particular ride path); (4) an antenna on each obstacle that receives and transmits messages/data packets from the packet data transceiver; (5) a control program/module (or command processor) that integrates the current state of the obstacle with state data from adjacent or nearby vehicles and that, in response, acts to operate the obstacle if and as needed to allow an approaching vehicle to pass along the ride path without collision with the controlled obstacle; (6) a command generator for inserting operating commands into the obstacle's state modifying/setting system's command processor; (7) a module/mechanism for translating the output of the obstacle's command processor into electric, hydraulic, or pneumatic power to a motor or engine used to set the state of the obstacle; and (8) an actuator, a motor, an engine, or the like of the state modifying/setting system operating in response to the output from the obstacle's command processor. Note, in some cases, the control system would be thought of as including the first five (or potentially six) of these components/functions.

FIG. 1 is a functional block diagram of an exemplary vehicle (land or water passenger vehicle or the like) 110 for use in a park ride incorporating the distributed control system of the present description, and such a park ride would typically include two, three, or more of such vehicles and, in some cases, obstacles with local control assemblies as discussed below with reference to FIG. 3. The vehicle 110 includes a body 112 that may be configured with space and/or seating for one or more passengers, which may include an operator of the vehicle 110 that may operate manual operator inputs (e.g., a steering wheel, a throttle, a brake, and the like) 116 to provide operator movement inputs/requests 117 to a drive system 114 in or on the body 112.

The vehicle 110 may be used in a park ride or similar application to move at a velocity or speed, V (as shown with arrow 115) along a ride path 104, which may have one or more curves (e.g., blind corners) limiting visibility to other vehicles (similarly configured to vehicle 110) and/or obstacles in the ride path 104. The vehicle 110 has its travel relative to the path 104 limited or constrained as shown with linkage or coupling 113. For example, the vehicle 110 may be a wheeled or similar vehicle that rides on or along a track defining the ride path 104 or may be a water craft or vessel floating in water 105 that is tethered to a bogie or similar device riding on a track (defining the ride path 104) at the bottom of the water 105. The drive system 114 is chosen to suit the ride and its ride path environment such as a motor or engine along with a braking system for driving wheels along a track/path 104 or a propulsion system with a propeller(s) for moving a vessel on or through water 105. In some embodiments, the drive system 114 is a relatively low power drive for moving a heavy and large vehicle in water 105 such that control signals 117 from an operator via inputs 116 or control signals 176 from onboard control assembly 120 need to be provided well in advance as the vehicle 110 is slow to speed up and to slow down/brake.

Significantly, the autonomously controlled vehicle 110 includes an onboard control assembly 120 in or on the body 112 that functions to locally generate the control signals 176 that supplement or override the manually-provided commands/requests 117 to avoid collisions and to provide park assist. The control assembly 120 is shown to include one or more processors 122 that manage one or more memory or data storage devices 130 for storing data useful for generating the control signals 176 for the drive system 114. The processor 122 also runs software, programs, and/or code to provide the functionalities discussed herein including determining a vehicle state, processing and generating messages (data packets), determining distances to other vehicles and obstacles, and running a control decision algorithm for generating the control signals 116 (e.g., for maintaining a safe envelope about the vehicle body 112 to avoid collisions or to facilitate stops in a parking situation).

To provide local and autonomous control (or distributed control when the vehicle 110 is in a ride with other similar vehicles as part of a ride control system), the control assembly 120 includes a state determination mechanism 140 that is configured to determine a present vehicle state 142 that is stored in memory 130 by the CPU 122. The vehicle state 142 may include a variety of parameters such as current speed 144 (shown at 115 as V in FIG. 1) and acceleration 145, in some cases, and this information may be obtained from the drive system 114 or outputs of its sensors/gauges. The vehicle state 142 also includes the current location or position 146 of the vehicle 110 (e.g., a position on the ride path 104), and the location/position 146 is determined whether the vehicle 110 is indoors or outdoors. The state determination mechanism 140, hence, may include GPS and/or differential GPS devices to obtain the present location 146. In other cases, though, the state determination mechanism 140 may be adapted to use inertial navigation or fixed location sensors to measure the position 146 of the vehicle 110 (and speed 144 and acceleration 145 in some implementations). The state data 142 may be obtained by using products available from Trimble Navigation Ltd, Spectracom Corp., or other manufacturers/distributors of position, speed, acceleration, and other state determination devices. The state data 142 is collected on an ongoing and nearly continuous basis (e.g., once every few seconds for a slow moving vehicle or a shorter duration for faster moving vehicles).

The local/onboard control program/module 170 may be adapted to manage operations of the various components of the control assembly 120 including triggering operations of a transceiver 150 to generate outgoing messages 154 and to receive incoming messages 156 (which are sent and received in a wireless manner via antenna 152). The outgoing messages 154 are communicated to other vehicles in the ride that may be on the ride path 104 for processing by their onboard control assemblies (configured similar to assembly 120 on vehicle 110), and each outgoing message 154 includes all or a portion of the vehicle state 142 (at least the position 146 of the vehicle 110 but typically also at least the speed 144). The incoming messages 156 are received from other vehicles in the ride and obstacles in the ride path 104. The vehicle messages 156 include their vehicle states including their position (and often speed and acceleration), and the obstacle messages 156 include the current operating state of the obstacle (e.g., door open or closed or in process of opening or closing, switch in particular position, and the like). The transceiver (or communication module) 150 may also include a transponder for placing the state 142 into data packets for inclusion in messages 154, and the transceiver 150 may take many forms to practice the control assembly 120 (such as a VHF mobile radio or the like). The states of the nearby vehicles and obstacles are stored in memory 130 as shown at 158.

The control assembly 160 further includes a distance/space determination mechanism or module 160 used by the control program 170 to generate a distance to each vehicle or obstacle on the ride. This distance is stored in memory 130 as shown at 164 for each vehicle or obstacle (or at least those within a predefined distance or envelope radius for the vehicle 110). The distances 164 are determined by comparing the position of each vehicle and obstacle provided in the incoming messages 156 with the position 146 of the vehicle 110 provided in the current state data 142.

The control assembly 160 also includes a local/onboard control program or module 170 that runs an algorithm or routine to determine whether control signals 176 need to be generated and communicated to the drive system 114 to avoid collisions or provide park assist based on the determined distances 164 and other data. The other data considered by the control program 170 may include vehicle and drive parameters 148 as well as the vehicle state data 142. The vehicle and drive parameters 148 may provide the vehicle's weight for use in inertia calculations. The vehicle and drive parameters 148 may also include specifications for the drive system 114 such as braking and acceleration capabilities as well as navigational or maneuvering characteristics for the vehicle 110 and the body 112. In brief, the control program 170 may determine that based on the present speed 144 and position 146 of the vehicle 110 that a signal 176 to modify the acceleration or speed 115 of the vehicle 110 is desirable due to the present distance 164 to another vehicle or to an obstacle whose received state data indicates it is not in a safe state (an operating state that allows the vehicle 110 to pass the obstacle on the ride path 104 without collision). The modification of the drive system 114 by commands/signals 176 may be a full braking operation, a change in speed or acceleration, and/or a change in steering.

Figure 2A:
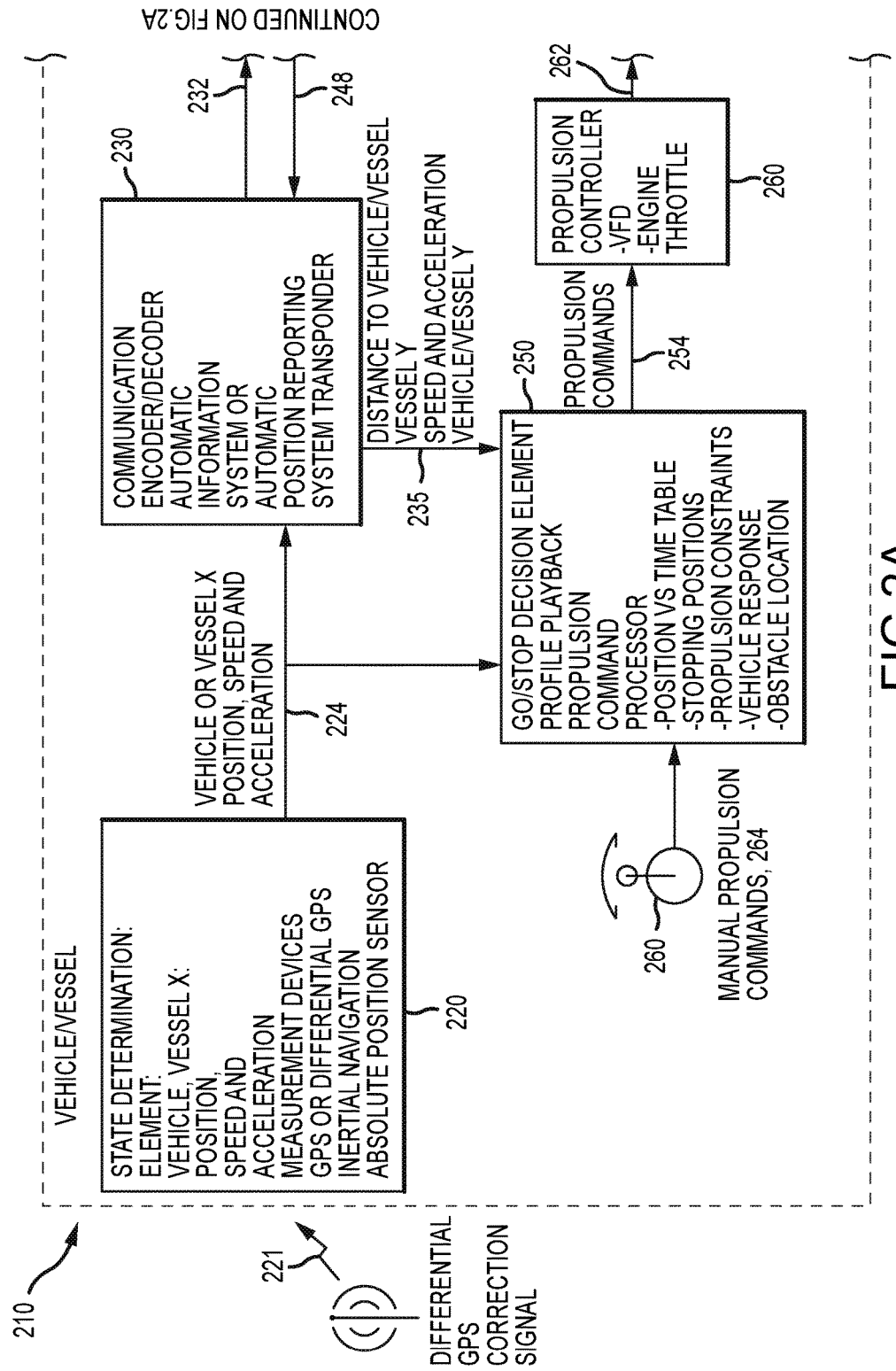
FIGS. 2A and 2B together provide a schematic diagram of each vehicle in a park ride implementing a distributed ride control system for guided-path vehicles.
Figure 2B:
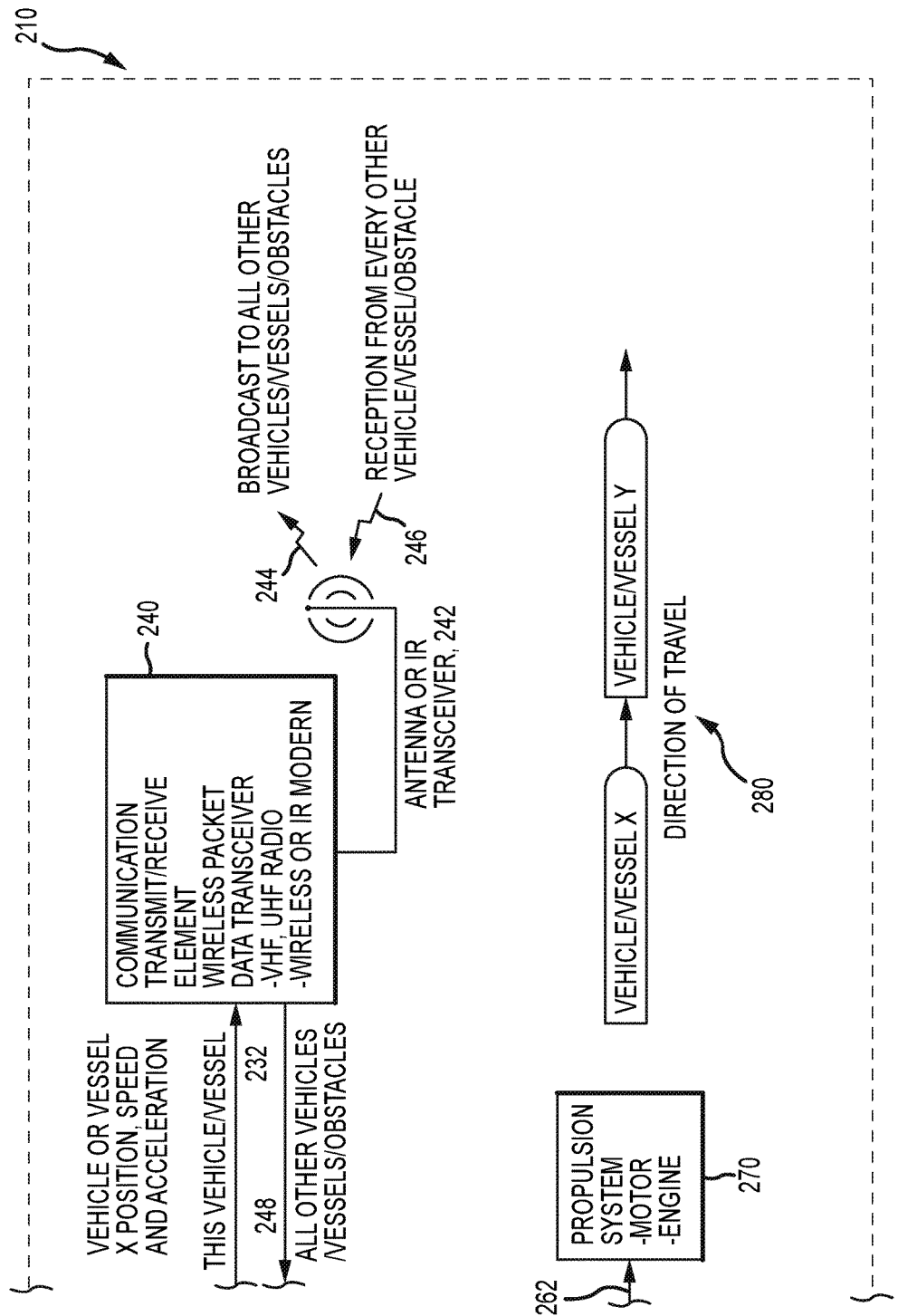
Figure 3:
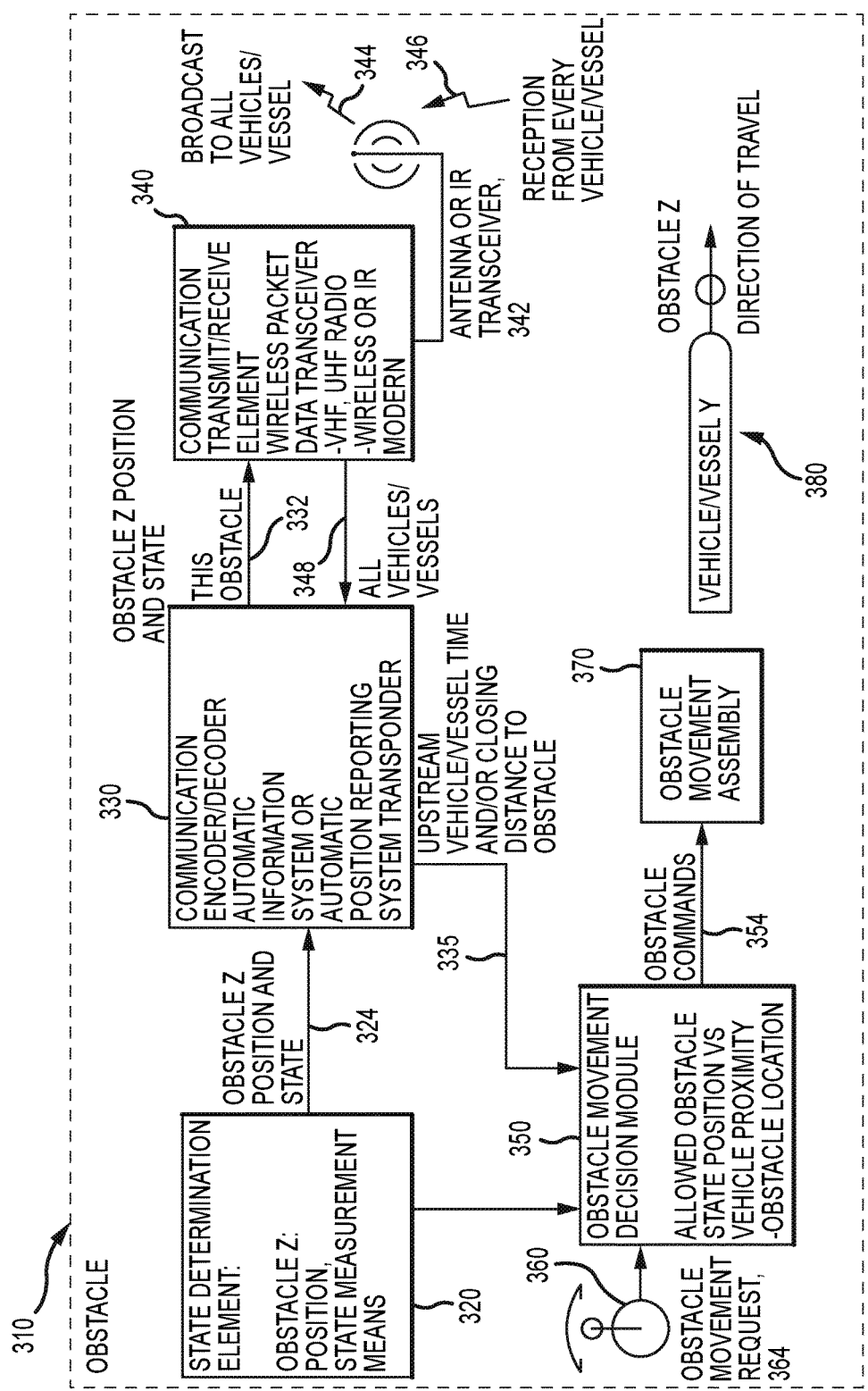
FIG. 3 is a schematic diagram for an obstacle included in a park ride with vehicles configured as shown in FIG. 2 to provided distributed and autonomous control of the vehicles and obstacles.

FIG. 2 is schematic diagram for each vehicle 210 in a park ride implementing a distributed ride control system for guided-path vehicles (i.e., the ride (not shown) would include two or more of the vehicles 210 and one to many of the obstacles 310 of FIG. 3). The vehicle 210 includes a state determination element 220 that operates to determine a current "state" of the vehicle 210. The state may include position, speed, and acceleration of the vehicle 210, and the state determination element 220 may include devices for measuring or determining these three state parameters. To this end, the state determination element 220 may receive input a differential GPS correction signal 221 and/or may include a differential GPS sensor or may include a GPS sensor. In the same or other implementations, the element 220 may include an inertial navigation sensor and/or an absolute position sensor. The output 224 of the state determination element 220 is shown to include the determined or measured vehicle position, speed, and acceleration, which may be provided as input to a communication encoder/decoder 230 and to a go/stop decision (controller) element 250.

The vehicle 210 also includes a communication encoder/decoder 230 that processes the vehicle state information 224 into packets 232 that are communicated to communication transmit/receive element 240. The communication encoder/decoder 230 also receives and processes data packets 248 with state data from other vehicles and obstacles (e.g., vehicles and obstacles on a ride or the like). To this end, the communication encoder/decoder 230 may take the form of an automatic information system, an automatic position reporting system, or other similar and often commercially-available transponder. The communication encoder/decoder 230 in the implementation of the control system of FIG. 2 also is adapted to determine the distance to the vehicle or obstacle, providing the state data 248, from the vehicle 210 based on its state data 224. This distance for obstacles and vehicles and the current speed and acceleration of the vehicles providing the state data 248 is provided as output 235 to the go/stop decision or controller element 250.

To allow vehicle-to-vehicle and obstacle-to-vehicle communications, the vehicle 210 includes a communication transmit/receive element 240 along with an antenna and/or IR receiver 242 that broadcasts the data packets with state data as shown at 244 to the other vehicles (and obstacles in some cases) of the ride and that receives the data packets with state data as shown at 246 from other ride vehicles and obstacles. The communications 244, 246 are wireless, and the communication element 240 may take the form of a wireless packet data transceiver, which may take the form of a VHF and/or UHF radio, a wireless or IR modem, or the like.

The distributed control system with vehicle 210 is further implemented by providing each vehicle 210 with an intelligent onboard controller or go/stop decision element 250. The go/stop decision element or vehicle controller 250 takes as input the present state data 224 from the state determination element, the distance to the vehicles and obstacles and other state data (speed and acceleration) of the vehicles 235 from the communication encoder/decoder 230, and also manual drive or propulsion commands 264 from vehicle drive input devices 260 (e.g., a steering wheel, accelerators and brakes, and the like). The go/stop decision element 250 may further playback a ride profile for the vehicle 210 along with the other three inputs described above. The go/stop decision element 250 may include or use a propulsion command processor to generate a set of propulsion commands 254 to a propulsion controller 260, which in turn signals 262 operation of the vehicle's propulsion system 270 (e.g., a motor, an engine, or the like).

The element 250 acts to integrate the vehicle's state data 224 with vehicle propulsion performance (e.g., propulsion constraints, vehicle response specification, and the like in memory as shown in FIG. 2) with similar data 235 from other vehicles and obstacles and acts to keep a safe distance between vehicles and obstacles blocking the path of the vehicle 210 via propulsion commands 254. The present relation of the vehicle 210 to adjacent vehicles may be monitored and stored in memory as shown at 280, and such relative travel may include the present direction of travel of the vehicles along the ride path as well as current spacing/distance between the two vehicles and each of their speeds and accelerations (which can be used to predict changes in the spacing/distance during a next predefined time period).

In some embodiments, the go/stop decision element 250 also is configured to generate the propulsion commands 254 to optimize the timing of the vehicle 210 along a ride path and to minimize the time needed to accurately park the vehicle 210. To this end, the element 250 may utilize a time table in memory for the vehicle 210 for the ride path that defines a set of waypoints on the ride path, and the element 250 may act to automatically speed up or slow down the vehicle 210 with commands 254 to hit the waypoints at particular times defined in the time table. Park assist with commands 254 may be facilitated by definitions of stopping positions that may be compared with present state data 224 of the vehicle 210 by the element 250.

FIG. 3 is schematic diagram for an obstacle 310 in a park ride implementing a distributed ride control system with a vehicle 210 in a park ride. The obstacle 310 includes a state determination element 320 that operates to determine a current "state" of the obstacle 310. The state may include position (which typically does not change over time) and operational state (door open or closed, door opening/closing, track switch in position X or Y, and so on) of the obstacle 310, and the state determination element 320 may include devices for measuring or determining these state parameters (see devices for element 220 at least for position determination although the position may be determined once and stored in memory or hard coded into the element 320 or its memory). In the same or other implementations, the element 320 may include an absolute position sensor. The output 324 of the state determination element 320 is shown to include the obstacle's position and operating state/mode, which may be provided as input to a communication encoder/decoder 330 and to an obstacle movement (or operating state change) decision element or controller 350.

The obstacle 310 also includes a communication encoder/decoder 330 that processes the obstacle state information 324 into packets 332 that are communicated to communication transmit/receive element 340. The communication encoder/decoder 330 also receives and processes data packets 348 with state data from vehicles (including vehicle 210). To this end, the communication encoder/decoder 330 may take the form of an automatic information system, an automatic position reporting system, or other similar and often commercially-available transponder. The communication encoder/decoder 330 in the implementation of the control system of FIG. 3 also is adapted to determine the distance to each approaching vehicle, providing the state data 348, from the obstacle 310 based on its state data 324. This distance from vehicles and the current speed and acceleration of the vehicles providing the state data 348 is provided as output 335 to the obstacle movement decision or controller element 350.

To allow obstacle-to-vehicle communications, the obstacle 310 includes a communication transmit/receive element 340 along with an antenna and/or IR receiver 342 that broadcasts the data packets with obstacle state data as shown at 344 to the vehicles on the ride and that receives the data packets with state data as shown at 346 from the vehicles. The communications 344, 346 are wireless, and the communication element 340 may take the form of a wireless packet data transceiver, which may take the form of a VHF and/or UHF radio, a wireless or IR modem, or the like.

The distributed control system with vehicle 210 and obstacle 310 is further implemented by providing the obstacle 310 with an intelligent onboard controller or obstacle movement decision element 350. The obstacle movement element or vehicle controller 350 takes as input the present state data 324 from the state determination element 320, the distance to the vehicles and other state data (speed and acceleration) of the vehicles 335 from the communication encoder/decoder 330, and also manual drive or propulsion commands 364 from obstacle control input devices 360 (e.g., a control panel for requesting a track switch to operate to allow a vehicle out of park or stop location and the like).

The element 350 acts to integrate the obstacle's state data 324 with obstacle operation characteristics (e.g., time to switch between two operating states/modes or the like) with state data 335 from approaching vehicles and acts to operate the obstacle movement assembly 370 in a safe manner (e.g., to allow the vehicles to pass without collision with the obstacle). The present relation of the obstacle 310 to a nearest vehicle may be monitored and stored in memory as shown at 380, and such relative positioning may include the present direction of travel of the vehicle along the ride path as well as current spacing/distance between the vehicle and the obstacle 310 and the vehicle's speed and acceleration (which can be used to predict changes in the spacing/distance during a next predefined time period).

Figure 4:
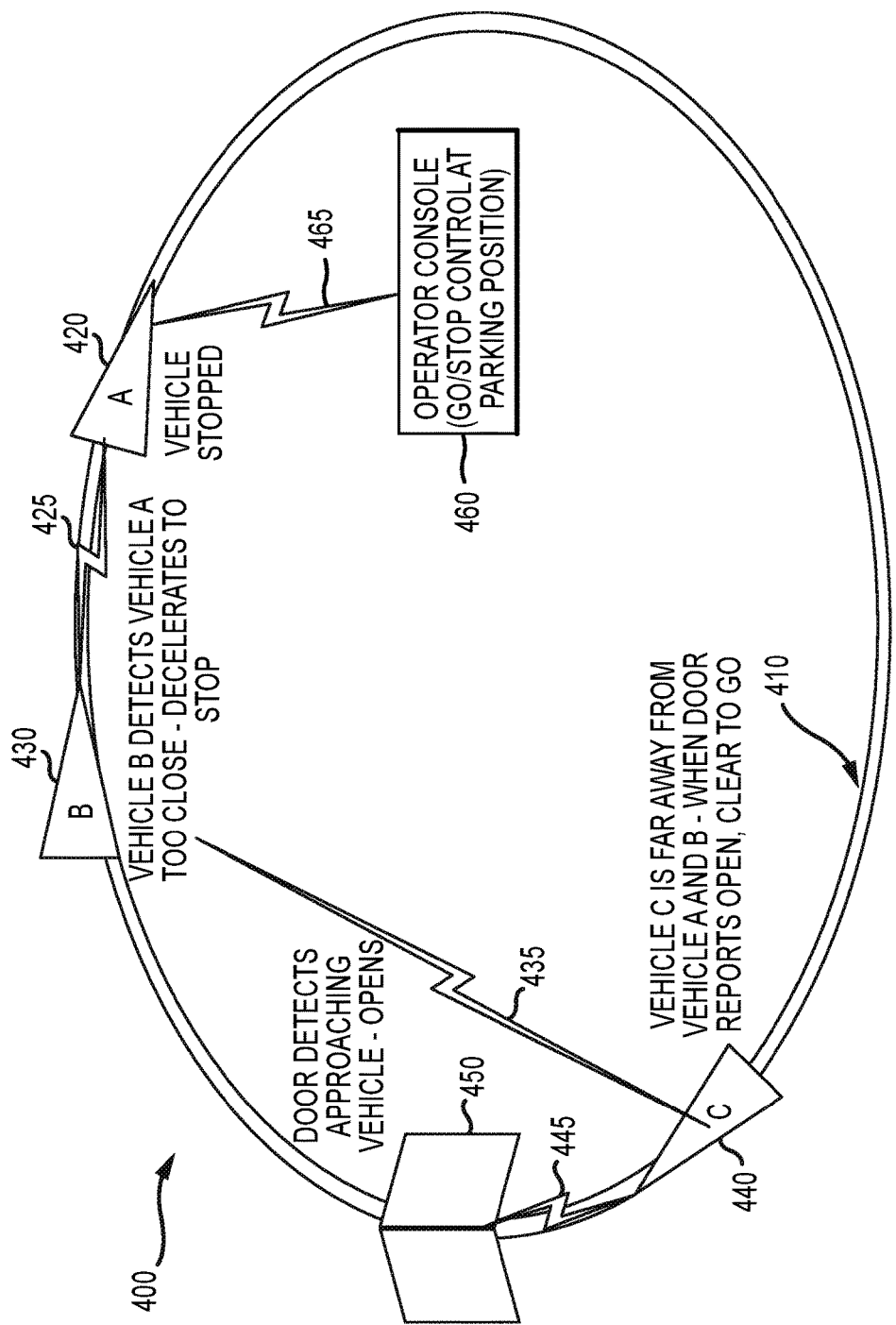
FIG. 4 is a schematic diagram of a park ride with vehicles and an obstacle each configured so as to implement a distributed, autonomous ride control system of the present description during exemplary operations.

FIG. 4 is a schematic diagram of a park ride 400 with vehicles 420, 430, and 440 and an obstacle 450 that are each configured so as to implement a distributed, autonomous ride control system of the present description during exemplary operations of the ride 400. The vehicles 420, 430, and 440 may be configured as shown for vehicle 210 in FIG. 2 (or as vehicle 110 in FIG. 1) while the obstacle 450 may be configured as shown for obstacle 310 in FIG. 3.

FIG. 4 is useful for showing operations of the autonomous vehicles and obstacles during simple operations to move the vehicles 420, 430, 440 along the track 410 (i.e., as guide-path restrained vehicles). The track 410 is shown to be curvilinear such that it may be more difficult for a trailing vehicle to see a leading vehicle as the track 410 may have blind corners or corners restricting visibility for a distance useful for proper stopping. A single obstacle 450 is shown, but the ride 400 may include two or more of such obstacles (such as switches in track 410). The obstacle 450 is shown to take the form of a ride-action door that can open to allow a vehicle to pass on track 410 (or on a ride path defined by the track 410) and to close (as shown) to separate two adjacent portions of the track 410.

The ride 400 is shown in FIG. 4 at one particular operating state with the obstacle 450 blocking the ride path adjacent to the track 410 and with lead vehicle 420 stopped at a location on the track 410. Communications 425 between the vehicles 420 and 430 allow the control assembly on the second or trailing vehicle 430 to determine a distance between the vehicles 420 and 430 and that the vehicle 420 is stopped (speed is zero). The distance and speed of vehicle 420 is determined by processing the state data in the communication 425 from the vehicle 420 and comparing a present position of the vehicle 420 with a present position of the vehicle 430. As noted on FIG. 4, the control assembly of vehicle 430 has determined that the distance is too small between vehicles 420 and 430, and the control assembly has generated a control signal/command to its drive system to decelerate the vehicle 430 to stop to avoid collision with vehicle 420. In other embodiments, the command/control signal may have simply slowed the vehicle 430 such as when the vehicle 420 had a present state indicating it was accelerating from a stop.

The control assembly of third (or second trailing) vehicle 440 communicates as shown at 435 with the vehicle 430 and as shown at 445 with the obstacle 450. With regard to the vehicle 430, the control assembly of vehicle 440 determines a distance and current state of the vehicle 430. From this information and its own state data (i.e., its speed and acceleration and current location), the control assembly of vehicle 440 determines that the distance between the vehicles 430 and 440 is large enough (a safe distance) such that its operations do not have to be modified to ensure no collision with vehicle 430.

From the communications 445 with the obstacle 450, the control assembly of vehicle 440 determines that the obstacle state is such that the path is blocked, and the vehicle 440 may slow or stop until (depending on the distance to the obstacle 450 and its current speed and/or acceleration) it receives a later communication 445 indicating the obstacle 450 is in a state not blocking the path (e.g., door is open or is opening and will be adequately opened by a time the vehicle 440 reaches the obstacle 450 (i.e., the location of the obstacle 450 which is also provided in the communication 445 from the obstacle 450 to the vehicle 440)). Further, from communications 445, the control assembly on the obstacle 450 determines that the vehicle 440 is approaching at a speed (and with an acceleration in some cases) and is at a present distance away from the obstacle 450, and the control assembly triggers it to change from a first operating state (closed door blocking the ride path) to a second operating state (open or otherwise not blocking the ride path) to avoid collision with the approaching vehicle 440. The control assembly of the obstacle 450 may base the operation changing decision solely on the separation distance or may base the decision on a combination of this distance and the present speed/acceleration data for the vehicle 440. FIG. 4 also illustrates that an operator via an operator console or the control assembly 460 may operate to transmit control signals/communications 465 to provide go and stop control over the vehicle's drive system at the parking position/location shown at 420. These controls (as discussed with reference to FIG. 5) may include automated or at least assisted parking controls for the vehicle to place it into a parking position/location at 420.

FIG. 5 is a flow diagram of a distributed ride control method 500 showing steps or functions carried out on each vehicle by an onboard control assembly, and the combined control assemblies on the vehicles along with obstacles (in some embodiments) provide a ride control system for a park ride or similar application. The method 500 starts at 505 such as by providing the components of a control assembly on a ride vehicle, and these components may take the form shown in FIG. 1 or in FIG. 2. Generally, the control assembly components include devices for determining a present state of the vehicle, for communicating this state data to other vehicles and obstacles, for receiving and processing communications from other vehicles and nearby obstacles, and for determining whether to modify drive or propulsion system operations of the vehicle (and, if so, how) to avoid collision (or assist in efficient parking operations).

The method 500 continues at 510 with the onboard control assembly of the vehicle determining the present state data for the vehicle. This will typically include determining both a position/location of the vehicle (such as with GPS-based approaches when outdoors or other approaches such as inertial navigation or positive position sensing when indoors) and a speed of the vehicle. In some embodiments, the state information will include addition information such as the acceleration of the vehicle to allow prediction of a future speed of the vehicle (or at least to indicate whether the vehicle is at steady speed or slowing down/speeding up).

The method 500 then involves concurrently monitoring for communications from other vehicles and obstacles along the ride path that may be operating to block the ride path. As shown at 520, the method 500 involves the control assembly on the vehicle monitoring for communications from another vehicle providing state data for that vehicle (similar state data as collected in step 510). If not, the step 520 is repeated. If data is received at 520, the method 500 continues at 530 with the control assembly functioning to determine a distance to the other vehicle and also other state data provided in the message (such as the other vehicles present speed, acceleration, and direction of travel (in some cases)). The distance between the two vehicles is determined by comparing the present location of the two vehicles.

At step 540, the control assembly determines whether the distance is "safe" based on the present state of the vehicle on which the control assembly is mounted and other parameters. The present state data of relevance may include the speed (and acceleration) of the two vehicles, e.g., are the two vehicles traveling the same speed so the distance will not change or is one going faster than the other. The other parameters may involve specifications for the vehicle such as its size and mass (which can be used to determine its inertia), its braking capabilities, and/or its navigation characteristics. If the distance is "safe" or large enough such that collision is not considered an issue, the method 500 may continue at 510 (in some cases, another step is provided to speed up the vehicle to reach a waypoint quicker when the distance is large enough to support such acceleration by the vehicle), with step 555 being performed before 510 (in some cases) allowing optional manual control of the vehicle or automated control of the vehicle based on the present state of the vehicle. If not safe, the method 500 continues at 550 with the control assembly on the vehicle modifying (with a drive system command or the like) operations of the vehicle's drive or propulsion system such as to brake or to slow down. The method 500 may then continue at 510 or end at 590 (such as when the operations of a ride are ended).

As shown at 560, the method 500 involves the control assembly on the vehicle monitoring for communications from an obstacle providing state data for that obstacle. The state data from an obstacle typically will include the location of the obstacle and also its present operating state (e.g., blocking the path or not blocking the path of the vehicle at the location of the obstacle). If not received, the step 560 is repeated. If data is received at 560, the method 500 continues at 565 with the control assembly functioning to determine a distance to the obstacle and also other state data provided in the message (such as whether a door is closed, whether a track switch is to the left or right, or the like). The distance between the vehicle and the obstacle is determined by comparing the present location of the vehicle and the fixed location of the obstacle.

At step 570, the control assembly determines whether the distance is "safe" based on the present state of the vehicle on which the control assembly is mounted and other parameters. The present state data of relevance may include the speed (and acceleration) of the vehicle and, in some cases, whether the vehicle is accelerating or decelerating as it approaches the obstacle. The state data also includes that of the obstacle as it may be "safe" if the obstacle is in a non-path blocking position/operating state and unsafe if blocking the path. The other parameters considered may involve specifications for the vehicle such as its size and mass (which can be used to determine its inertia), its braking capabilities, and/or its navigation characteristics. If the distance is "safe" or large enough such that collision is not considered an issue, the method 500 may continue at 510 (in some cases, another step is provided to speed up the vehicle to reach a waypoint quicker when the distance is large enough to support such acceleration by the vehicle), with step 584 being performed, optionally, prior to step 510 to allow manual operations of the vehicle and/or automatic control of the vehicle based on the vehicle's current state. If not safe, the method 500 continues at 580 with the control assembly on the vehicle modifying (with a drive system command or the like) operations of the vehicle's drive or propulsion system such as to brake or to slow down. The method 500 may then continue at 510 or end at 590 (such as when the operations of a ride are ended).

As shown at 561, the method 500 involves the control assembly on the vehicle monitoring for ride controllers and/or parking docks/elements providing data for parking the vehicle at a particular parking location such as a docking station/pier/dock. The data from the controller or parking dock/element typically will include the location of the parking location and components (such as a load/unload location/ramp, dock bumpers, vehicle capture components, and the like). If not received, the step 561 is repeated. If data is received at 561, the method 500 continues at 567 with the control assembly functioning to determine a distance and direction to the parking location and also other state/control data provided in the message. The distance between the vehicle and the location (or its components such as a dock side, bumpers, and the like) (and/or direction to the parking location) is determined by comparing the present location of the vehicle and the fixed location of the parking location/components.

At step 570, the control assembly determines whether the distance is "safe" based on the present state of the vehicle on which the control assembly is mounted and other parameters. The present state data of relevance may include the speed (and acceleration) of the vehicle and, in some cases, whether the vehicle is accelerating or decelerating as it approaches the parking location to determine if docking will be performed at a desired speed. The state data may also be used to determine whether the present direction of travel should be changed to dock the vehicle in the parking space and at a preferred orientation of the vehicle's body. The other parameters considered may involve specifications for the vehicle such as its size and mass (which can be used to determine its inertia), its braking capabilities, and/or its navigation characteristics. If the distance is "safe" or large enough (along with the vehicle's present velocity) such that any parking collision is not considered an issue, the method 500 may continue at 510 (via step 584). If not safe or not at desired parking velocity, the method 500 continues at 581 with the control assembly on the vehicle modifying (with a drive system command or the like) operations of the vehicle's drive or propulsion system such as to brake or to slow down or modify its direction of travel and/or vehicle body orientation. The method 500 may then continue at 510 or end at 590 (such as when the operations of a ride are ended).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A park ride with distributed and autonomous control of vehicles, comprising:
   a ride path;
   a plurality of vehicles each constrained to move along the ride path and each including a drive system for moving the vehicle at a speed within a range of speeds; and
   a control assembly provided on each of the vehicles,
   wherein each of the control assemblies includes:
       a transceiver transmitting messages with state data for a sending one of the vehicles to other ones of the vehicles and for receiving messages with the state data from the other ones of the vehicles,
       a distance determination module processing the state data for the sending one of the vehicles and the state data from at least one of the other ones of the vehicles to determine a distance between the sending one of the vehicles and the at least one of the other ones of the vehicles,
- a control module generating a drive control signal for the drive system, based on the distance, that modifies the speed of the sending one of the vehicles, and
- a state determination mechanism operating to determine a speed and an acceleration of the sending one of the vehicles, wherein the state data includes the speed and the acceleration of the sending one of the vehicles, and wherein the control module generates the drive control signal based on the speed and the acceleration of the sending one of the vehicles.

2. The park ride of claim 1, wherein the state data includes a position of the sending one of the vehicles and wherein the state determination mechanism determines the position.

3. The park ride of claim 2, wherein the state determination mechanism determines the position when the sending one of the vehicles is outdoors and indoors.

4. The park ride of claim 1, wherein the drive control signal causes the drive system to reduce the speed and override any manual operator inputs to the drive system.

5. The park ride of claim 1, wherein the drive control signal is generated based on a time table with waypoints on the ride path for the sending one of the vehicles and wherein the drive control signal causes the drive system to accelerate or decelerate to arrive at one of the waypoints within an arrival time defined by the time table.

6. The park ride of claim 1, wherein the drive control signal is further generated by the control module based on parameters of the vehicle and parameters of the drive system.

7. A park ride with distributed and autonomous control of vehicles, comprising:
- a ride path;
- a plurality of vehicles each constrained to move along the ride path and each including a drive system for moving the vehicle at a speed within a range of speeds;
- a control assembly provided on each of the vehicles, wherein each of the control assemblies includes:
  - a transceiver transmitting messages with state data for a sending one of the vehicles to other ones of the vehicles and for receiving messages with the state data from the other ones of the vehicles,
  - a distance determination module processing the state data for the sending one of the vehicles and the state data from at least one of the other ones of the vehicles to determine a distance between the sending one of the vehicles and the at least one of the other ones of the vehicles, and
  - a control module generating a drive control signal for the drive system, based on the distance, that modifies the speed of the sending one of the vehicles; and
- an obstacle with a state change mechanism and an obstacle control assembly, wherein the obstacle control assembly operates to communicate obstacle state data to the vehicles that includes a position of the obstacle and an operating state of the obstacle, operates to determine a distance between the obstacle and at least one of the vehicles, and operates the state change mechanism based on the determined distance to modify the operating state of the obstacle.

8. The park ride of claim 7, wherein the modifying of the operating state of the obstacle includes changing the obstacle from a first operating state in which the obstacle at least partially blocks the ride path to a second operating state in which the obstacle allows passage of the vehicles on the ride path nearby the position of the obstacle.

9. The park ride of claim 7, wherein at least one of the vehicles receives the obstacle state data from the obstacle with the transceiver and, in response, uses the distance determination module to determine a distance between the at least one of the vehicles and the obstacle and uses the control module to generate the drive control signal to decrease the speed of the vehicle when the obstacle state data indicates the obstacle is in an operating state that blocks the ride path.

10. A vehicle control method, comprising:
- determining a state of a first vehicle and a state of a second vehicle, wherein the first and second vehicles are constrained to travel along a ride path, wherein the state of the first vehicle comprises a current location of the first vehicle, and wherein the state of the second vehicle comprises a current location of the second vehicle;
- transmitting a message with the state of the second vehicle to the first vehicle;
- receiving the message at the first vehicle;
- at the first vehicle, processing the message to identify the current location of the second vehicle and to determine a distance between the first and second vehicles based on the current locations of the first and second vehicles; and
- based on the distance, modifying operations of a drive system of the first vehicle.

11. The method of claim 10, wherein the modifying of the drive system of the first vehicle includes reducing a speed of the first vehicle free of human operator input.

12. The method of claim 10, wherein the state of the first vehicle includes a speed of the first vehicle, wherein the state of the second vehicle includes a speed of the second vehicle, and wherein the modifying of the drive system of the first vehicle is based on the distance and the speeds of the first and second vehicles.

13. The method of claim 12, wherein the modifying of the drive system of the first vehicle is further performed based on parameters for the first vehicle and for the drive system of the first vehicle.

14. The method of claim 10, further comprising comparing the location of the first vehicle with a parking location on the ride path and, based on the comparing, generating a set of control commands for the drive system to navigate the first vehicle into the parking location on the ride path free of human operator input.

15. A vehicle control method, comprising:
- determining a state of a first vehicle and a state of a second vehicle, wherein the first and second vehicles are constrained to travel along a ride path, wherein the state of the first vehicle comprises a current location of the first vehicle, and wherein the state of the second vehicle comprises a current location of the second vehicle;
- transmitting a message with the state of the second vehicle to the first vehicle;
- receiving the message at the first vehicle;
- at the first vehicle, processing the message to identify the current location of the second vehicle and to determine a distance between the first and second vehicles based on the current locations of the first and second vehicles;
- based on the distance, modifying operations of a drive system of the first vehicle; and
- receiving at the first vehicle a message from an obstacle on the ride path, processing the message from the obstacle to determine a location of the obstacle and an operating state of the obstacle, determining a distance between the obstacle and the first vehicle based on the locations of the obstacle and the first vehicle, and based on the distance between the obstacle and the first vehicle and the operating state of the obstacle modifying operations of the drive system of the first vehicle.

16. A ride with distributed control of vehicles, comprising:
   a first vehicle; and
   a second vehicle, wherein the first and second vehicles each includes a drive system and a control assembly,
   wherein each of the control assemblies includes:
      a transceiver transmitting messages with state data for a sending one of the first and second vehicles and for receiving messages with the state data from the other one of the first and second vehicles,
      a distance determination module processing the state data for the sending one of the first and second vehicles and the state data from at least one of the other one of the first and second vehicles to determine a distance between the first and second vehicles, and
      a control module generating a drive control signal for the drive system, based on the distance, that controls a speed of the sending one of the first and second vehicles,
   wherein the state data includes a position of the sending one of the vehicles,
   wherein the control assembly further includes a state determination mechanism determining the position, and
   wherein the drive control signal is further generated by the control module based on parameters of the vehicle and parameters of the drive system.

17. The ride of claim 16, wherein the state determination mechanism further operates to determine a speed and an acceleration of the sending one of the first and second vehicles, wherein the state data includes the speed and the acceleration of the sending one of the first and second vehicles, and wherein the control module generates the drive control signal based on the speed and the acceleration of the sending one of the first and second vehicles.

18. The ride of claim 16, wherein the drive control signal is generated based on a time table with waypoints on the ride path for the sending one of the first and second vehicles and wherein the drive control signal causes the drive system to accelerate or decelerate to arrive at one of the waypoints within an arrival time defined by the time table.

19. A ride with distributed control of vehicles, comprising:
   a first vehicle;
   a second vehicle,
   wherein the first and second vehicles each includes a drive system and a control assembly,
   wherein each of the control assemblies includes:
      a transceiver transmitting messages with state data for a sending one of the first and second vehicles and for receiving messages with the state data from the other one of the first and second vehicles,
      a distance determination module processing the state data for the sending one of the first and second vehicles and the state data from at least one of the other one of the first and second vehicles to determine a distance between the first and second vehicles, and
      a control module generating a drive control signal for the drive system, based on the distance, that controls a speed of the sending one of the first and second vehicles,
   wherein the state data includes a position of the sending one of the vehicles, and
   wherein the control assembly further includes a state determination mechanism determining the position; and
   an obstacle with a state change mechanism and an obstacle control assembly, wherein the obstacle control assembly operates to communicate obstacle state data to the first and second vehicles that includes a position of the obstacle and an operating state of the obstacle, operates to determine a distance between the obstacle and at least one of the first and second vehicles, and operates the state change mechanism based on the determined distance to modify the operating state of the obstacle.

20. The ride of claim 19, wherein the modifying of the operating state of the obstacle includes changing the obstacle from a first operating state in which the obstacle at least partially blocks the ride path to a second operating state in which the obstacle allows passage of the first and second vehicles on the ride path nearby the position of the obstacle.

21. The ride of claim 19, wherein at least one of the first and second vehicles receives the obstacle state data from the obstacle with the transceiver and, in response, uses the distance determination module to determine a distance between the at least one of the first and second vehicles and the obstacle and uses the control module to generate the drive control signal to decrease the speed of the first or second vehicle when the obstacle state data indicates the obstacle is in an operating state that blocks the ride path.

* * * * *